United States Patent [19]

Takahashi

[11] 4,024,341

[45] May 17, 1977

[54] METHOD OF PICKING OUT SYNCHRONIZING LIGHT BEAM IN LIGHT SCANNING SYSTEMS

[75] Inventor: Tsunehiko Takahashi, Asaka, Japan

[73] Assignee: Fuji Photo Film Co., Ltd., Minami-ashigara, Japan

[22] Filed: July 21, 1975

[21] Appl. No.: 597,503

[30] Foreign Application Priority Data

July 23, 1974 Japan .............................. 49-84409

[52] U.S. Cl. ................................ 358/206; 178/15; 358/148

[51] Int. Cl.² ......................................... H04N 3/00

[58] Field of Search ................. 178/7.6, 69.5 F, 15

[56] References Cited

UNITED STATES PATENTS 3,783,295  1/1974  Casler ................................. 178/7.6
3,867,571  2/1975  Starkweather et al. ............ 178/7.6

Primary Examiner—Marshall M. Curtis
Attorney, Agent, or Firm—Gerald J. Ferguson, Jr.; Joseph J. Baker

[57] ABSTRACT

In a light scanning recording or displaying system, a synchronizing light beam is separated from a signal light beam used for recording images or display utilizing the difference in wavelength of the two light beams. The synchronizing light beam and the signal light beam are produced by different light sources of different wavelength and made to advance in the same direction to be reflected and deflected by a light scanning means such as a rotating mirror together in the same direction. After both the light beams are deflected by the light scanning means, the two beams are divided by use of a prism, a holographic plate or a dichroic mirror.

10 Claims, 3 Drawing Figures

METHOD OF PICKING OUT SYNCHRONIZING LIGHT BEAM IN LIGHT SCANNING SYSTEMS

BACKGROUND OF THE INVENTION

1. Field of the Invention

This invention relates to a method of picking out a synchronizing light beam in a light scanning system, and more particularly to a method of picking out a synchronizing light beam separated from a signal light beam with which the former is synchronized in a light scanning system.

2. Description of the Prior Art

Light scanning systems are well known and used in various optical systems such as optical beam recording, oscillograph tracing, television line generation, detection of surface imperfections of webs and so forth. In such light scanning systems, galvanometer type vibrating mirrors or rotating mirrors of polygonal structure are often used as a light scanner. The light scanner is required to be driven in accurate synchronization with the recording medium or the web detected so that the scanning of the light beam thereon may be accurately synchronized with the movement thereof in the direction perpendicular to the direction of scanning. When the brightness of the light spot of the scanning light beam formed on the recording medium or the web is to be indicated in an oscilloscope or a recorder or put in an electronic computer as an input signal, it is necessary to supply a synchronizing signal accurately synchronized with the scanning light beam to these output devices. Particularly when an image is displayed or recorded, it is highly essential that the image signal be accurately synchronized with the position of the light spot of the scanning light beam which is detected or indicated by the synchronizing light beam.

In order to obtain a synchronizing signal which indicates the position of the light spot of the scanning light beam formed by the rotating mirror, a variety of methods employing magnetic, electric or photoelectric means have been employed to detect the state of rotation of the rotating mirror. As one of the methods of detecting the state of rotation of the rotating mirror employing a photoelectric means, it has been known in the art to make a light beam impinge upon a face of the rotating mirror used to deflect the signal light beam and cause the light beam deflected by the rotating mirror to be detected as a synchronizing light beam. Methods of photoelectrically detecting the state of rotation of the rotating mirror are divided into two groups in one of which the signal light beam used for displaying or recording images and the synchronizing light beam are made by a single light source and in the other of which the signal light beam and the synchronizing light beam are made by different light sources.

In the conventional method of photoelectrically detecting the state of rotation of the rotating mirror by use of a single light source, the light beam emitted by a single light source is divided into a signal beam and a synchronizing beam by a beam splitter before the light beam is modulated and then the signal beam and the synchronizing beam are deflected by different facets of the rotating mirror. In this method, there are defects in that the correction of errors in the angle of facets in the direction of scanning is difficult and dust proof casing for covering and protecting the rotating mirror must be provided with a large opening for the synchronizing light beam. Further, it has also been known in the art to make the signal beam and the synchronizing beam divided from a light beam from a single light source impinge upon a single facet of the rotating mirror and to detect the synchronizing beam by use of a photoelectric detector located at a position where the detector does not obstruct the scanning signal beam for forming an image. In this method, there are defects that particular care must be taken to prevent crosstalk between the signal beam and the synchronizing beam and the photoelectric detector must be located in the very limited space where the light scanner and other optical systems are arranged. Further, both these methods are disadvantageous in that the intensity of the signal light beam is reduced by the beam splitter.

In the other conventional method of photoelectrically detecting the state of rotation of the rotating mirror by use of different light sources, the crosstalk can be comparatively easily prevented by making the wavelength of the signal beam different from that of the synchronizing beam. However, in this method, there is a defect in that the arrangement of various optical and electrical elements is considerably difficult since the light source of the synchronizing light beam, a converging optical system for the synchronizing beam and a photoelectric detector must be located in the same small space occupied by a light source of the signal light beam, a converging optical system for the signal beam and the rotating mirror. In addition, even in this method there is a possibility of crosstalk when the optical path of the signal beam and that of the synchronizing beam are close to each other. Therefore, this method requires use of a condenser lens or a filter in order to pick out the synchronizing beam with sufficiently high signal-to-noise ratio.

In the light scanning systems employing a rotating mirror, a spot motion stabilizing means is usually provided to stabilize the spot motion perpendicular to the scan direction caused by the error in manufacture of the faces of the rotating mirror. Since a highly accurate mirror having a sufficiently small face-to-axis of rotation tolerance is both difficult to manufacture and expensive, the scanning system employing a rotating mirror is usually provided with a spot motion stabilizing means comprising a combination of cylindrical lenses as disclosed e.g. in U.S. Pat. No. 3,750,189. The spot motion stabilizing means uses an optical system of complicated structure which occupies a large space around the rotating mirror. Therefore, in the light scanning systems wherein a spot motion stabilizing means is employed together with a rotating mirror, it is particularly difficult to arrange the various optical elements around the rotating mirror.

SUMMARY OF THE INVENTION

In view of the above-mentioned observations and description of the conventional light scanning systems, the primary object of the present invention is to provide a method of picking out a synchronizing light beam in a light scanning system employing a rotating mirror which is simple in construction and in arrangement of optical elements and occupies a small space around the rotating mirror.

Another object of the present invention is to provide a method of picking out a synchronizing light beam in a light scanning system employing a rotating mirror in which there is no fear of crosstalk occuring between the signal beam and the synchronizing beam.

Still another object of the present invention is to provide a method of picking out a synchronizing light beam in a light scanning system employing a rotating mirror which is capable of picking out an accurately synchronized synchronizing beam with a high signal-to-noise ratio.

A further object of the present invention is to provide a method of picking out a synchronizing light beam in a light scanning system employing a rotating mirror which is particularly suitable for a light scanning system provided with a spot motion stabilizing means for stabilizing the motion of a light spot in the direction perpendicular to the scan direction.

A still further object of the present invention is to provide a method of picking out a synchronizing light beam in a light scanning system employing a rotating mirror in which the opening in the dust-proof casing for covering and protecting the rotating mirror can be made small.

A still further object of the present invention is to provide a method of picking out a synchronizing light beam in a light scanning system employing a rotating mirror in which the intensity of the signal light beam is not lowered.

A still another object of the present invention is to provide a method of picking out a synchronizing light beam in a light scanning system employing a rotating mirror which can be manufactured at a low cost and accordingly is economically advantageous.

In accordance with the present invention, the above objects are accomplished by using two light sources of different wavelength and making the optical path of the beam from one light source aligned with the optical path of the beam from the other light source before the beams inpinge upon the facet of the rotating prism and then picking out the synchronizing light beam from the combined light beam utilizing the difference in wavelength between the two light beams after the combined light beam is deflected by the facet of the rotating mirror. The two light beams of different wavelength are separated by use of a prism through which the two light beams are deflected by different angles or by use of dichroic filters or mirrors. Further, a holographic plate can be used to separate the two beams of different wavelength.

DESCRIPTION OF THE PREFERRED EMBODIMENTS

Figure 1:
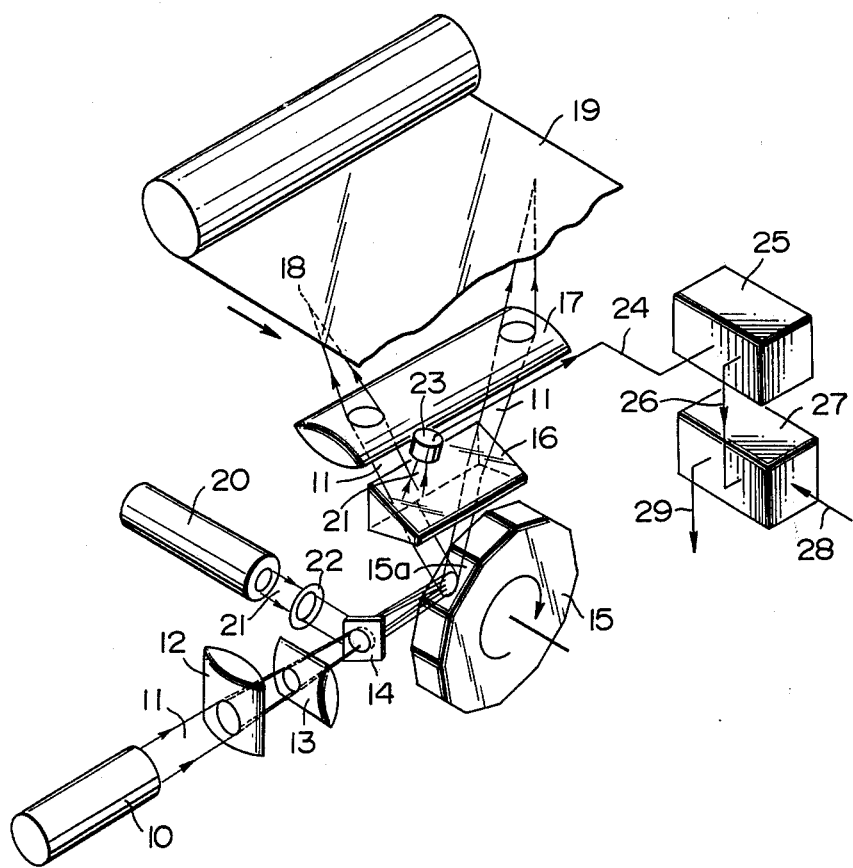
FIG. 1 is a schematic perspective view showing a light scanning system for recording images on a photosensitive paper with a scanning laser beam wherein the method of picking out a synchronizing light beam in accordance with the present invention is carried out.

A light scanning system in which the method of picking out the synchronizing light beam in accordance with an embodiment of the present invention is illustrated in FIG. 1. The light scanning system shown in FIG. 1 is a light beam recording system wherein an image is recorded on a photosensitive paper with a scanning light beam. Referring to FIG. 1, a signal light beam 11 of the wavelength of 0.442 microns produced by a helium cadmium laser source 10 is converged by a first cylindrical lens 12 and a second cylindrical lens 13 which have converging power in directions perpendicular to each other. The signal light beam 11 is then passed through a dichroic mirror 14. A synchronizing light beam 21 of the wavelength of 0.633 microns produced by a helium neon laser source 20 is converged through a spherical positive lens 22 and reflected by said dichroic mirror 14. The incident angle of the synchronizing light beam 21 impinging upon the dichroic mirror 14 is set so that the synchronizing light beam 21 reflected by the dichroic mirror 14 advances in the same direction as that of the signal light beam 11 passing through the dichroic mirror 14, i.e. so that the optical path of the synchronizing light beam 21 is in alignment with that of the signal light beam 11. The signal light beam and the synchronizing light beam advancing in the same optical path impinge upon the same facet 15a of a rotating mirror 15 of polygonal structure. The combined light beams reflected and deflected by the facet 15a of the rotating mirror 15 transmit through a prism 16, through which the light beams of different wavelength are divided. The signal light beam 11 passes through a third cylindrical lens 17 after it emits from the prism 16. The synchronizing light beam 21 impinges on a photodetector 23 after it emits from the prism 16. The photodetector 23 is located at a position to receive the synchronizing light beam 21 where the synchronizing light beam 21 starts to deflect from one end of a scanning line. The signal light beam 11 of the wavelength of 0.442 microns and the synchronizing light beam 21 of the wavelength of 0.633 microns are refracted by different angles by the prism 16 owing to the different refractive indices for the different wavelengths. The signal light beam 11 passing through the cylindrical lens 17 is converged to a point by the converging function of the first, second and third cylindrical lenses 13, 14 and 17 and forms a light spot 18 on a traveling photosensitive paper web 19. The photodetector 23 converts the synchronizing light beam 21 to an electric signal 24. The electric signal 24 is put into a waveform shaping circuit 25 and converted to synchronizing pulses 26. The synchronizing pulses 26 are put into a phase control circuit 27 where the synchronizing pulses 26 are compared with a standard synchronizing signal 28 supplied thereto. The phase control circuit 27 generates a control signal 29 as a result of phase comparison of said synchronizing pulses 26 and said standard synchronizing signal 28. The control signal 29 resulting from the above system is fed back to a driving power source of the rotating mirror 15 as information. The light spot 18 scans the traveling photosensitive paper web 19 in the direction perpendicular to the traveling direction thereof, and accordingly, an image is recorded on the photosensitive paper 19 thereby if the signal light beam 11 is modulated.

In the above described light scanning system for recording images on a photosensitive paper web 19, the dichroic mirror 14 may be located between the first and second cylindrical lenses 12 and 13 or between the first cylindrical lens 12 and the laser beam source 10. Similarly, the prism 16 for separating the two beams 11 and 21 may be located between the third cylindrical lens 17 and the paper web 19.

Figure 2:
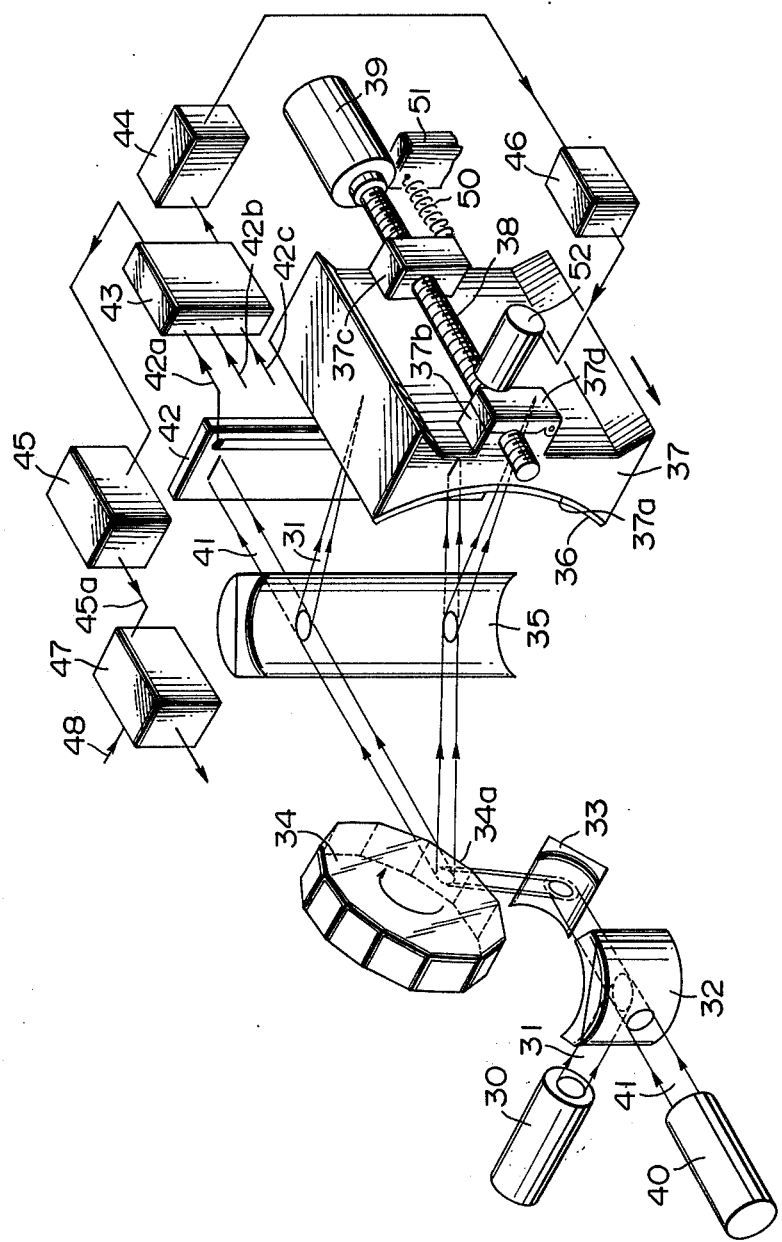
FIG. 2 is a schematic perspective view showing a light scanning system for recording images on a thermosensitive paper with a scanning infra-red light beam wherein the method of picking out a synchronizing light beam in accordance with the second embodiment of the present invention is carried out.

A second embodiment of the present invention is shown in FIG. 2 which shows a light scanning system for recording images on a thermosensitive paper with a scanning infra-red light beam employing the method of picking out the synchronizing light beam of this invention. Referring to FIG. 2, an infra-red signal light beam 31 of the wavelength of 1.06 microns produced by a YAG laser source 30 modulated by an image signal is converged by a first cylindrical mirror 32 and a second cylindrical mirror 33 which have converging power in directions perpendicular to each other. The converged signal light beam 31 forms a line image on a facet 34a of a rotating mirror 34 of polygonal structure. Said cylindrical mirror 32 bears a dichroic mirror surface which reflects red light and infra-red rays but passes blue light. A synchronizing blue light beam 41 produced by a laser source 40 is made to impinge on the cylindrical dichroic mirror 32 from back side thereof at such an angle that the blue light beam 41 passing through the dichroic mirror 32 advances in the same direction as that of the signal light beam 31 reflected by the dichroic mirror 32, i.e. so that the optical path of the synchronizing blue light beam 41 is in alignment with the that of the signal light beam 31. Since the area of a photodetector which receives and detects the synchronizing blue light beam 31 is generally large, the synchronizing blue light beam 31 is not required to form a line image on the facet 34a of the rotating mirror 34. Of course, however, if it is also required to stabilize the spot motion of the synchronizing blue light beam 41 perpendicular to the scan direction, the synchronizing light beam 41 can also be focused as a line image on the facet 34a of the rotating mirror 34. The combined light beams reflected and deflected by the facet 34a of the rotating mirror 34 impinge on a second dichroic cylindrical mirror 35 by which the light beams of different wavelength are divided. The signal light beam 31 of long wavelength is reflected by the dichroic cylindrical mirror 35 and converges to a beam spot on a thermosensitive recording material 36 mounted on a recording material holding member 37. The recording material holding member 37 has a cylindrically curved face 37a to support the recording material 36 and is slidable in the direction in which the cylindrically curved face 37a is not curved. A screw rod 38 driven by a motor 39 is engaged with the recording material holding member 37. As shown in FIG. 2, a hinged screwed member 37d is engaged with the screw rod 38 when the hinged screwed member 37d is closed. When the member 37d is opened, the screw engagement thereof with the screw rod 38 is released and the recording material holding member 37 is made free. In greater detail, the screw rod 38 is slidably engaged with support portions 37b and 37c integrally formed on the back of the recording material holding member 37. The support portions 37b and 37c are provided with a smooth through hole through which the screw rod 38 is slidably engaged. The recording material holding member 37 is spring-biased toward the motor 39 by a tension spring 50 tensioned between the recording material holding member 37 and a fixed member 51. A solenoid 52 is provided in the vicinity of said hinged screwed member 37d to open the same when energized. The hinged screwed member 37d is opened when the solenoid 52 is energized and closed when the same is not energized.

The synchronizing light beam 41 passes through the second dichroic cylindrical mirror 35 and impinges upon a photodetector 42. The photodetector 42 used in the embodiment shown in FIG. 2 is of the type which detects the position of a light spot impinging thereon and is made of silicon, cadmium selenium or cadmium sulfide. For instance, Light Position Sensing Photodetector LSC/9 made by United Detector Technology Incorporated can be used. In the commercially available light position sensing photodetector 42, three terminals are provided so that the position of the light spot formed thereon may be converted to an output voltage through a light spot detecting circuit 43 which is connected with the photodetector 42. The three terminals (not shown) are connected with the light spot detecting circuit 43 with three lead wires 42a, 42b and 42c. The output voltage of the detecting circuits 43 is sent to a counter 44 and an information processor 45. The counter 44 is connected with a solenoid relay driving circuit 46 which is connected with said solenoid 52 for releasing the screw-engagement of said hinged screwed member 37d and said screw rod 38. Thus, the solenoid 52 is driven when the recording material holding member 37 comes to a end to return the member 37 to its initial position. The information processor 45 is connected with an image signal supplying circuit 47 which receives an image signal 48. The information processor 45 receives the output voltage from said detecting circuit 43 which indicates the position of the light spot formed on the photodetector 42 by the rotating mirror 34 which accordingly carries information of errors in manufacture of the rotating mirror. Therefore, the information processor 45 is capable of giving a correcting signal 45a to the image signal supplying circuit 47 for correcting errors in the image signal with respect to the position of the light spot caused by manufacturing errors of the rotating mirror 34. Thus, the image signal 48 received by the image signal supplying circuit 47 is provided with the correcting signal 45a from the information processor 45 and then sent to a light modulation means (not shown) for modulating the signal light beam 31 to effect accurately synchronized modulation.

Figure 3:
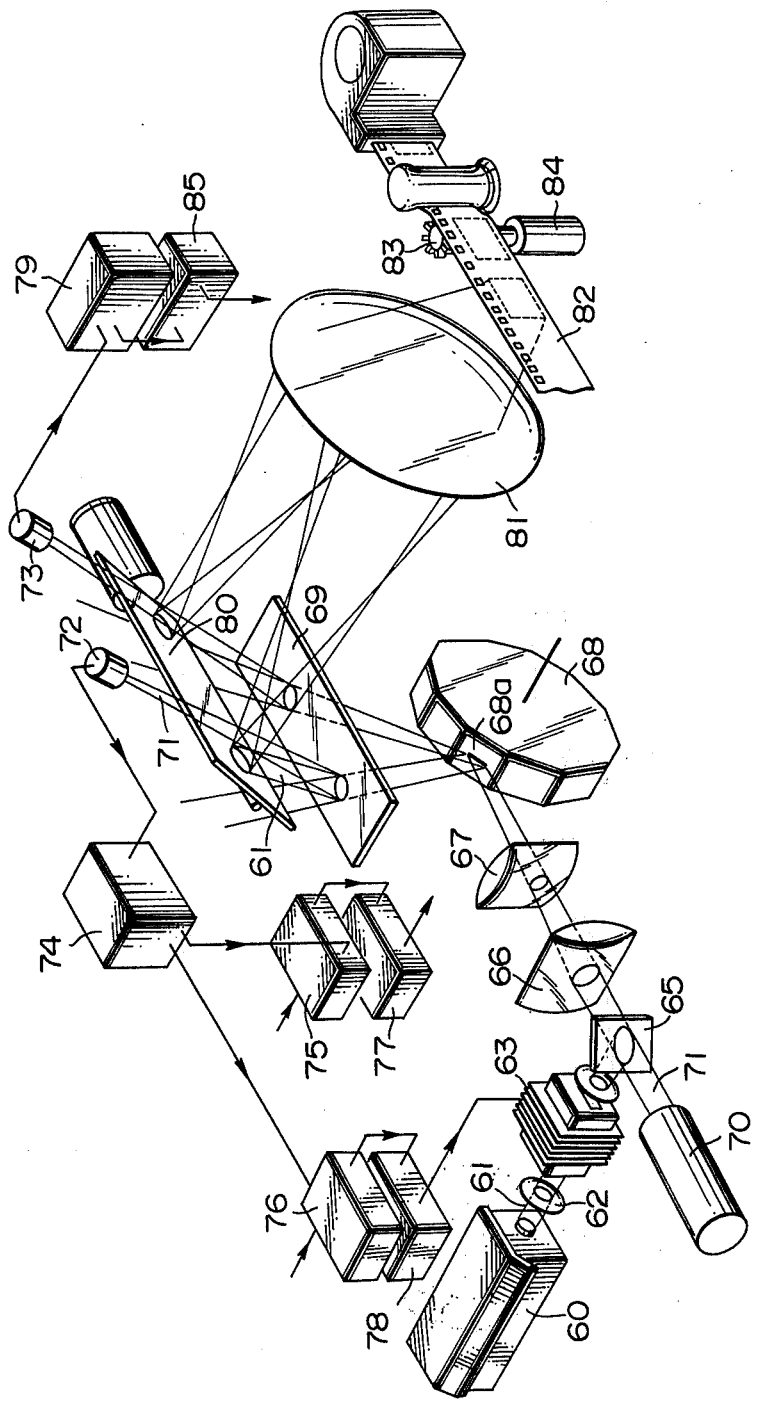
FIG. 3 is a schematic perspective view showing a light scanning system for recording images on a microfilm with a scanning light beam wherein the method of picking out a synchronizing light beam in accordance with the third embodiment of the present invention is carried out.

A third embodiment of the present invention is shown in FIG. 3 which shown a light scanning system for recording images on a microfilm with a scanning light beam employing the method of picking out the synchronizing light beam of this invention. Referring to FIG. 3, a light beam 61 of the wavelength of 0.488 microns is produced by an argon ion laser source 60 and converged through a converging lens 62. The converged light beam 61 is passed through an acousto-optical light modulation means 63. The light beam 61 is then collimated by a collimator lens 64 and impinges upon a dichroic mirror 65 which reflects the light beam 61 and passes a light beam of longer wavelength. A synchronizing red light beam 71 produced by a red light source 70 passes through the dichroic mirror 65 and advances in the same direction as that of said signal light beam 61 collimated by said collimator lens 64. The combined light beams are converged through a first and second cylindrical lenses 66 and 67 which have converging power in directions perpendicular to each other and a converged line image is formed on a facet 68a of a rotating mirror 68. The light beams are reflected by the facet 68a and deflected thereby and passed through a hologram plate 69 which has the same function as that of a cylindrical lens. The primary diffraction beam is converged only in one direction like in a cylindrical lens. The zero-order diffraction beam, i.e. the undiffracted beam, however, is not deflected but passes straight through the hologram plate 69. The hologram plate 69 is different from the cylindrical lens in that the chromatic aberration for the primary diffraction beam results in dispersion of the beam. That is, the primary diffraction beam of one color advances in the direction and that of another advances in another direction. Therefore, the signal light beam 61 and the synchronizing light beam 71 advance in different directions from the hologram plate 69 whereas the zero-order diffraction beams advance in the same direction. The signal light beam 61 is reflected by a vibrating mirror 80 which vibrates about an axis extending parallel to the scan direction and accordingly deflects the light beam in the direction perpendicular to the scan direction. The reflected light beam carrying signal information is converged by an image reducing lens 81 to form a microimage on a microfilm 82. The microfilm 82 is fed by a sprocket wheel 83 which is rotated by a pulse motor 84. The synchronizing light beam 71 is received by photodetectors 72 and 73 which are located at a starting position and a terminating position of a scanning line of the synchronizing light beam 71 deflected by the rotating mirror 68 and the hologram plate 69. The photodetector 72 located at the starting position is connected with a waveform shaping circuit 74 which shapes the synchronizing signal sent from the photodetector 72 into synchronizing pulses. The waveform shaping circuit 74 is connected with a revolution speed control circuit 75 and an image signal gate circuit 76 to send them the synchronizing pulses. The revolution speed control circuit 75 is also supplied with standard synchronizing pulses and said synchronizing pulses and the standard synchronizing pulses are compared to make a drive control signal. The drive control signal is sent to a motor driving amplifier 77 which drives said rotating mirror 68. Said image signal gate circuit 76 is also supplied with an image signal and the image signal is synchronized with the synchronizing pulses from the waveform shaping circuit 74 to make a modulation signal to be sent to a light modulation driving source 78. The modulation driving source 78 drives said acousto-optical light modulation means 63 in accordance the image signal synchronized with said synchronizing pulses. Said photodetector 73 located at the terminating position of the scanning line is connected with a pulse counting circuit 79 which counts the number of horizontal scanning lines made by the rotating mirror 68 and the vibrating mirror 80. When a predetermined number of scanning lines are counted by the pulse counting circuit 79, an order is sent to a frame feed signal generating circuit 85 to have the circuit 85 generate a frame feed signal to drive said pulse motor 84 to feed the microfilm 82 by one frame. Thus, the microfilm 82 is fed frame by frame by the pulse motor in synchronization with the scanning of the signal light beam 61.

As readily understood from the above description of the preferred embodiments of the present invention, the method of picking out a synchronizing signal in accordance with the present invention can be applied to various light scanning systems in which various types of photodetectors are employed. Further, in accordance with the present invention, other types of photodetectors for controlling the contrast or density of the image can be employed without making the structure of the light scanning system complicated. In addition, as will be readily understood from the above description, the method of the present invention can be applied to light scanning systems in which various types of light modulation means are employed.

I claim:
1. A method for picking out a synchronizing light beam in a light scanning system, said method comprising the steps of
   generating a signal light beam of a first wavelength;
   generating said synchronizing light beam of a second wavelength different than said first wavelength;
   rotating a polygonal mirror having a plurality of geometrically similar facets;
   advancing both light beams together on a common optical axis until the light beams are deflected by a facet of said mirror;
   dividing the two deflected beams into two separate optical axes; and
   detecting the divided synchronizing light beam to generate a synchronizing signal in response thereto, said detecting step occurring at predetermined position with respect to said mirror so that the synchronizing signal is generated only when the synchronizing light beam is deflected from at least one predetermined respective point on each facet of the mirror;
   whereby said signal light beam is available for repetitive scanning and said synchronizing signal marks at least one predetermined point in time for each scan; each predetermined point in time corresponding to a predetermined common point on the facets of the mirror.

2. Apparatus for picking out a synchronizing light beam in a light scanning system, said apparatus comprising
   means for generating a signal light beam of a first wavelength;
   means for generating said synchronizing light beam of a second wavelength different than said first wavelength;
   a multi-faceted polygonal mirror;
   means for rotating said mirror having a plurality of geometrically similar facets;
   means for advancing both light beams together on a common optical axis until the light beams are deflected by a facet of said mirror;
   wavelength selective beam dividing means for dividing the two deflected beams into two separate optical axes; and
   detecting means responsive to the divided synchronizing light beam for generating a synchronizing signal in response thereto, said detecting means being so positioned with respect to said mirror that said synchronizing signal is generated when the synchronizing light beam is deflected from at least one predetermined respective point on each facet of the mirror;
   whereby said signal light beam is available for repetitive scanning and said synchronizing signal marks at least one predetermined point in time for each scan; each predetermined point in time respectively corresponding to a predetermined point on the facets of the mirror.

3. Apparatus as defined in claim 1 wherein said wavelength selective beam dividing means is a prism at least one face of which is inclined with respect to the plane perpendicular to the optical axis of said beams deflected by the scanning means.

4. Apparatus as defined in claim 2 wherein said wavelength selective beam dividing means is a dichroic mirror which reflects one of said beams and passes the other.

5. Apparatus as defined in claim 2 wherein said wavelength selective beam dividing means is a hologram plate which deflects the beams of different wavelength by the primary diffraction in different directions.

6. Apparatus as defined in claim 2 including a spot motion stabilizing means for stabilizing the motion of the spot in the direction perpendicular to the scan direction, said last-mentioned means employing a cylindrical mirror, said cylindrical mirror carrying a dichroic mirror surface for separating said synchronizing light beam of said second wavelength from said signal light beam of said first wavelength.

7. Apparatus as defined in claim 2 including a spot motion stabilizing means for stabilizing the motion of the spot in the directions perpendicular to the scan direction, said last-mentioned means employing a hologram plate, said hologram plate deflecting beams of different wavelength in different directions by the primary diffraction.

8. Apparatus as defined in claim 2 wherein said detecting means comprises a photodetector located at a position where the synchronizing light beam starts scanning in a scanning line.

9. Apparatus as defined in claim 2 wherein said detecting means comprises a photodetector of the light position sensing type located at a position to receive the synchronizing light beam through the scanning thereof.

10. Apparatus as defined in claim 2 wherein said detecting means comprises a pair of photodetectors located at opposite ends of a scanning line of the synchronizing light beam.

* * * * *